INVENTOR
Donald J. Scheier

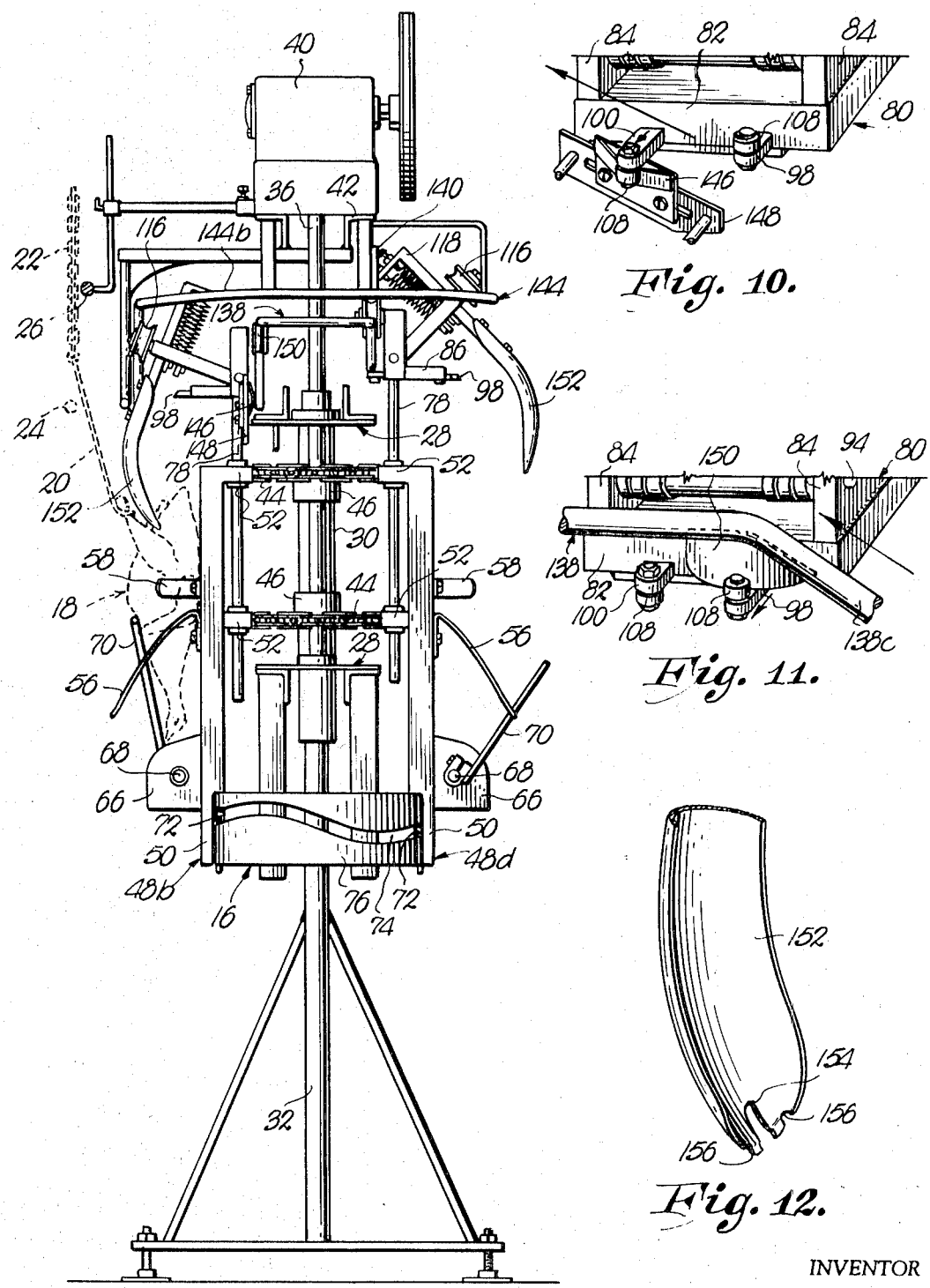

INVENTOR
Donald J. Scheier

BY Schmidt, Johnson, Hovey,
Williams & Bradley
ATTORNEYS

United States Patent Office 3,555,593
Patented Jan. 19, 1971

3,555,593
METHOD OF EVISCERATING POULTRY
Donald J. Scheier, Kansas City, Mo., assignor to Gordon Johnson Company, Kansas City, Mo., a corporation of Missouri
Filed Jan. 26, 1968, Ser. No. 700,907
Int. Cl. A22c *21/06*
U.S. Cl. 17—45
2 Claims

ABSTRACT OF THE DISCLOSURE

In the automatic evisceration of poultry the viscera is displaced from the body cavity of the bird, through an access opening cut at the vent, by pressure on the viscera away from the breast and by dragging the viscera along the backbone. Maximum pressure is applied initially to loosen the lungs whereupon the pressure is reduced so that the heart exerts a pull on the lungs by virtue of interconnecting veins. The entire operation takes place while the birds are advanced continuously by an overhead conveyor from which they are suspended by their legs. A series of bird-receiving carriages travel around a loop in timed relation to the conveyor, and each carriage has a viscera-removing spoon that enters the cavity on an arc which conforms to the configuration of the breast. After slight withdrawal of the spoon across the lungs, a latch is automatically released to remove the tension of a spring on the spoon. At the completion of the operation, a second latch is released to remove the tension of a second spring, causing the spoon to swing clear and permitting the eviscerated bird to continue along the conveyor line for successive processing operations.

---

It is an important object of my present invention to eviscerate poultry automatically by use of a spring-loaded spoon to first loosen the lungs and then to remove them as to avoid damage to internal organs and is withdrawn while the viscera is pressed against the backbone of the bird.

Another important object of the instant invention is to provide for withdrawal of the lungs, which are the most difficult to remove of the internal organs, by causing the spoon to first loosen the lungs and then to remove them by a pulling action through veins which connect the lungs with the heart.

Still another important object of the present invention is to perform all of the steps of viscera removal while the birds are continually advanced with the spoon being lowered through the access opening, swung along the breast and raised from within the body cavity without interruption.

Figure 1:
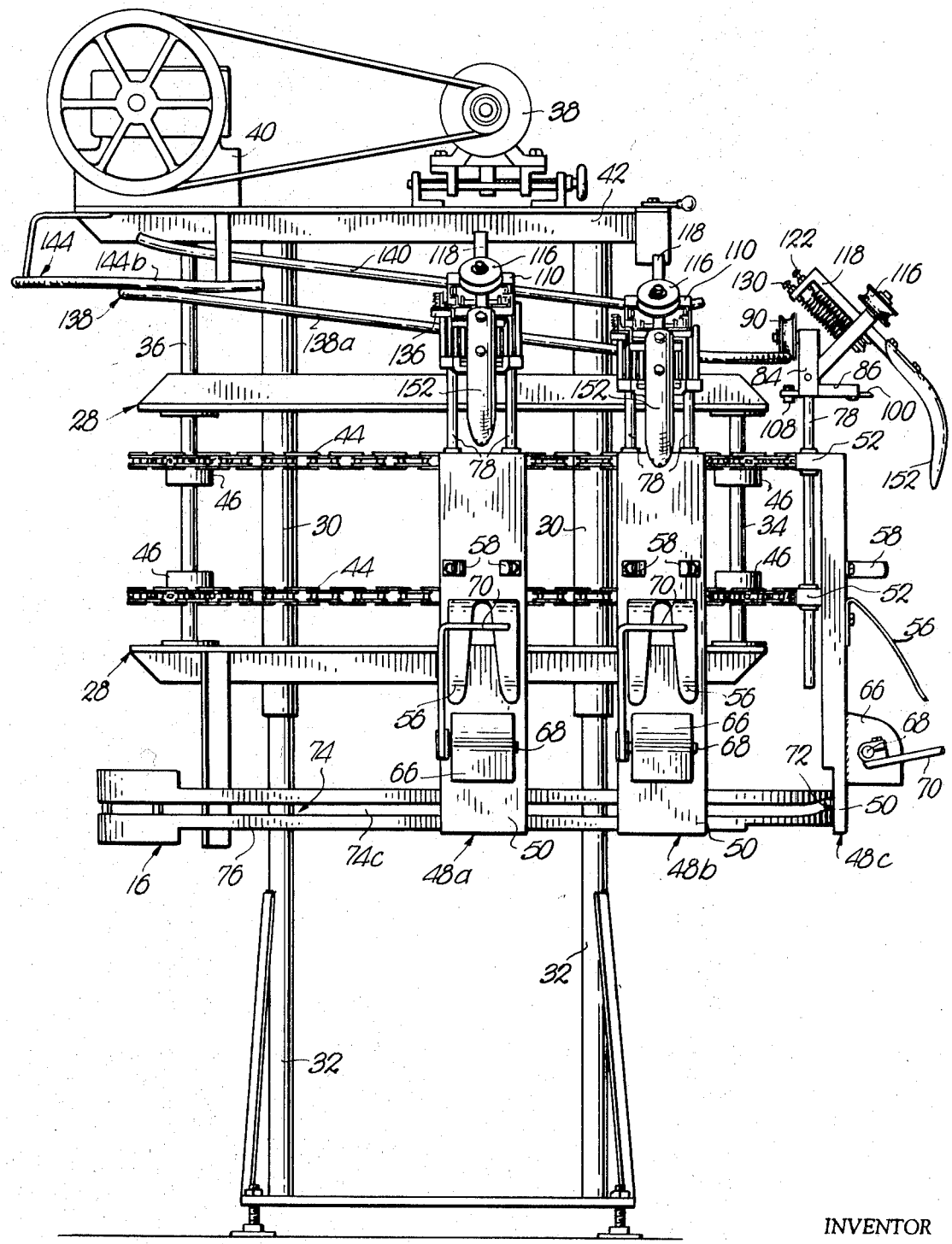
Figure 2:
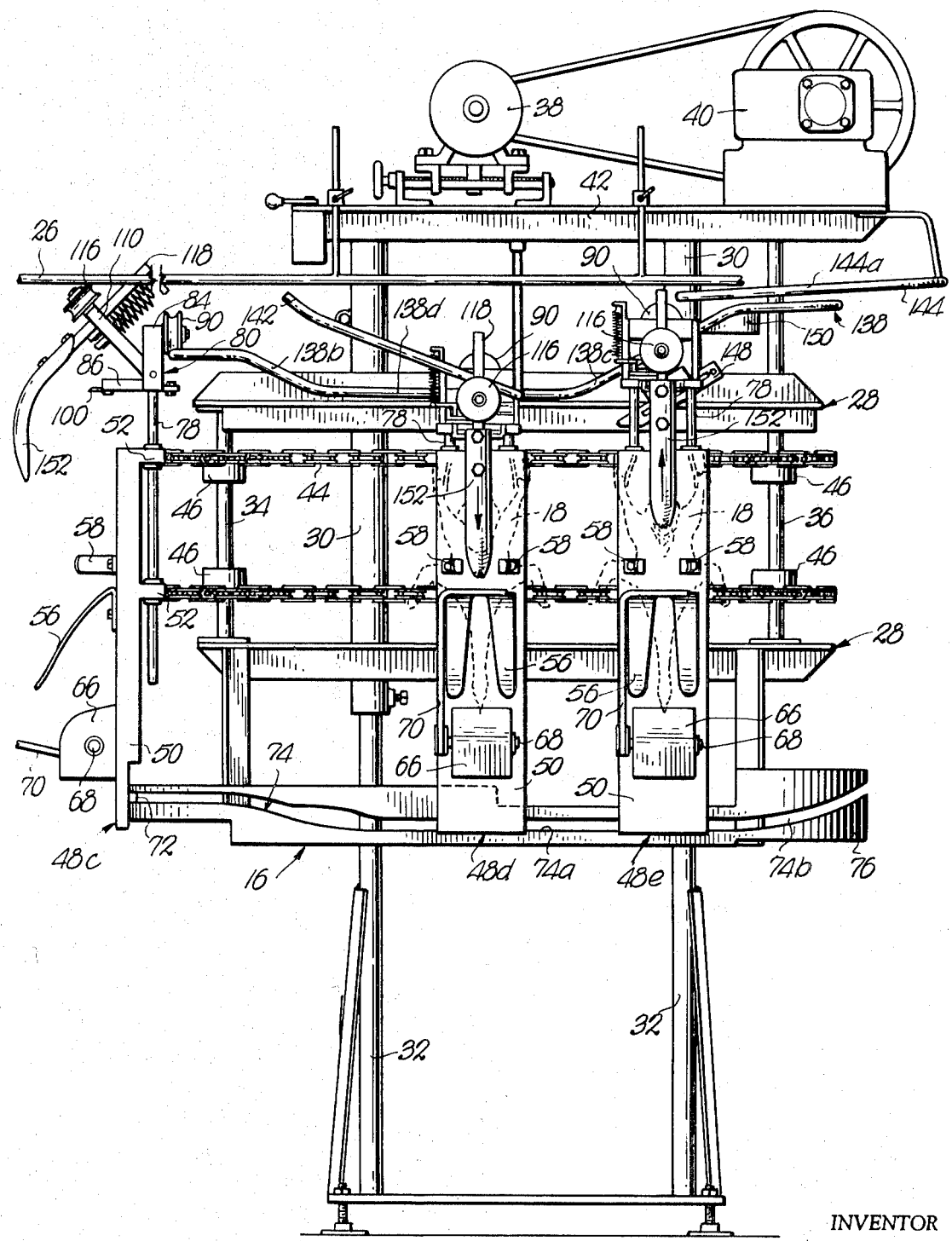
Figure 5:
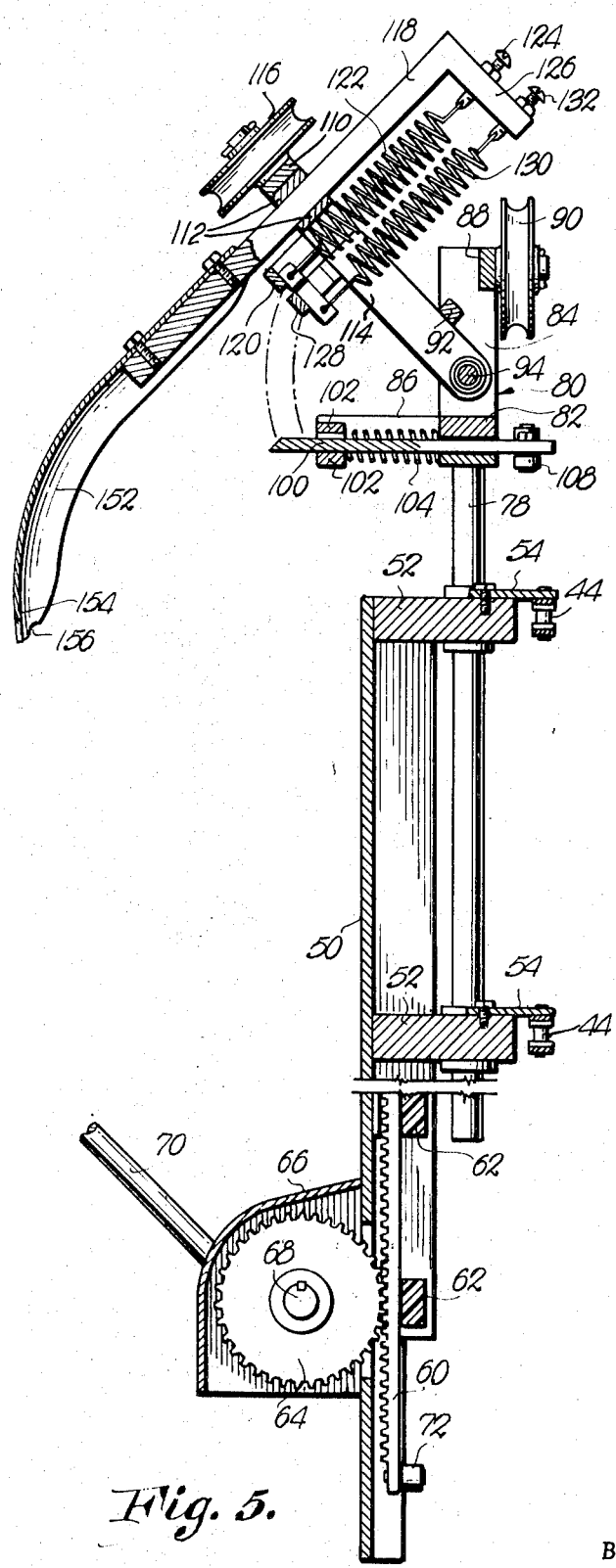
Figure 4:
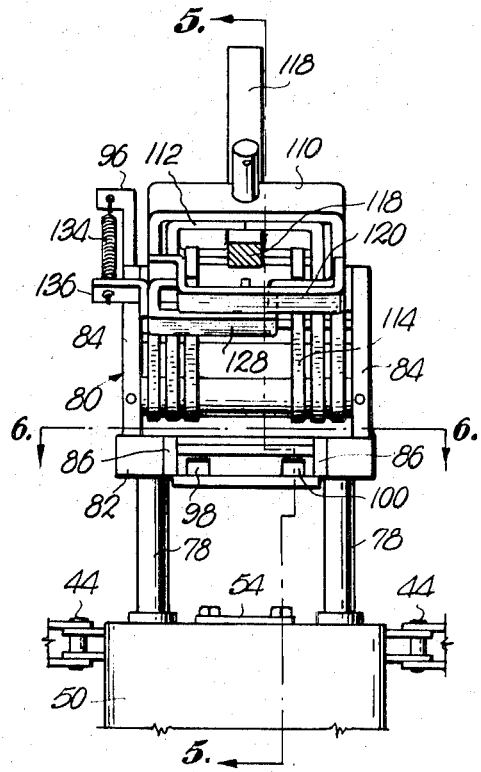
Figure 6:
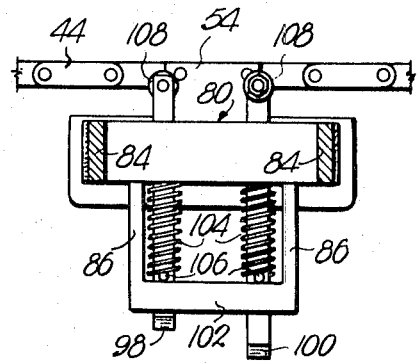
Figure 7:
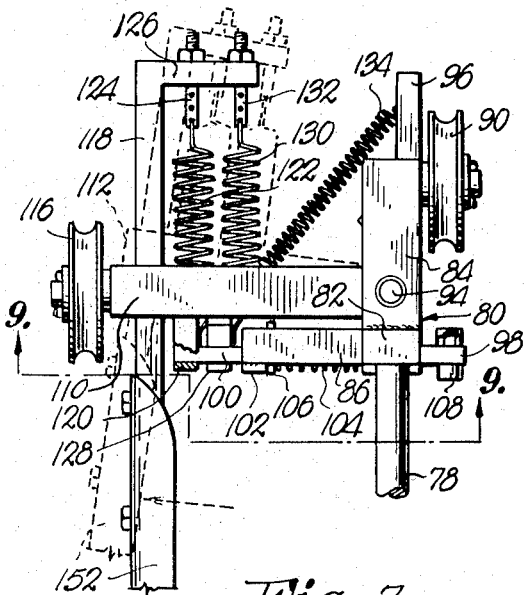
Figure 8:
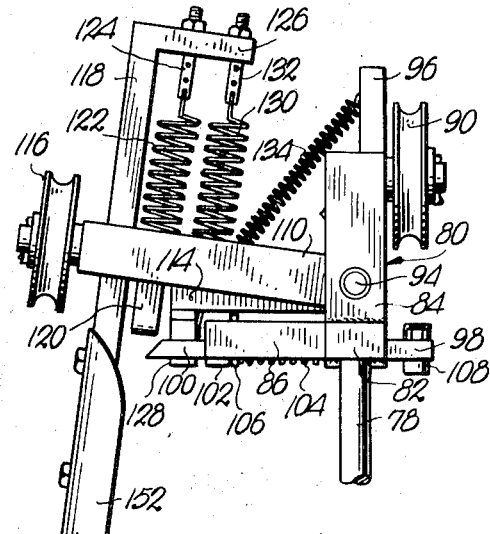
Figure 9:
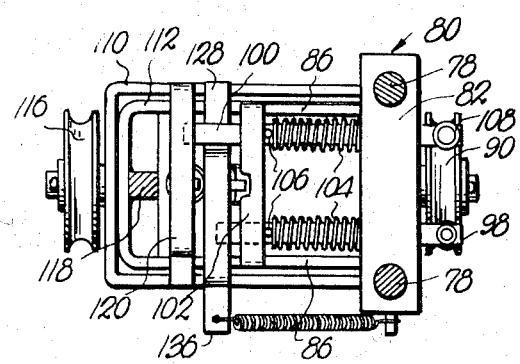
Figure 13:
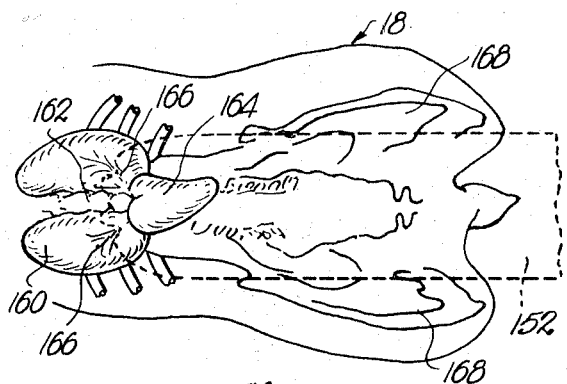
Figure 14:
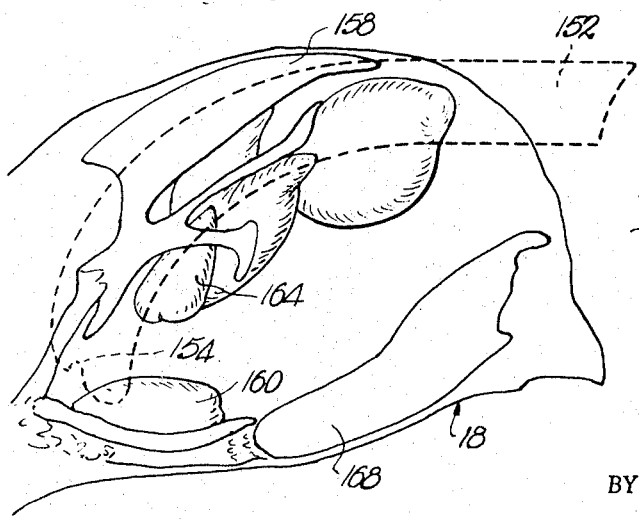

In the drawings:
FIG. 1 is a side elevational view of a poultry eviscerating machine made in accordance with my present invention;
FIG. 2 is an elevational view showing the opposite side thereof;
FIG. 3 is an end elevational view thereof;
FIG. 4 is an enlarged, fragmentary elevational view similar to FIG. 1 showing one of the carriages with the spoon and the rollers removed for clearness;
FIGS. 5 and 6 are cross-sectional views taken along lines 5—5 and 6—6 respectively of FIG. 4;
FIG. 7 is an enlarged, fragmentary leading end view of one of the heads of one of the carriages;
FIG. 8 is a view similar to FIG. 7 showing different positions of certain parts;
FIG. 9 is a cross-sectional view taken on line 9—9 of FIG. 7;
FIG. 10 is a detailed perspective view of one of the latch releases;

FIG. 11 is a detailed perspective view of the other latch release;
FIG. 12 is an enlarged, fragmentary perspective view of the spoon;
FIG. 13 is a plan view showing the viscera schematically and illustrating the spoon partially withdrawn from the bird cavity; and
FIG. 14 is a perspective view showing the viscera schematically and illustrating the spoon movement into the bird cavity.

The eviscerating machine 16 is shown by FIG. 3 for use in conjunction with an overhead conveyor for suspending birds 18 from their legs through use of shackles 20 swingable from chains 22, adjustable guide rods 24 and 26 being optionally provided for shackles 20 and chains 22 respectively.

Machine 16 includes basic framework 28 mounted on a pair of tubes 30 that are vertically adjustable on legs 32. Framework 28 carries a pair of spaced, upright shafts 34 and 36, the latter of which is driven by a motor 38 and gear reducer 40 on platform 42 secured to tubes 30. A pair of endless chains 44 around sprocket wheels 46 on shafts 34 and 36 support a number of carriages, only three of which are shown in FIG. 1 and designated 48a, 48b and 48c. FIG. 2 shows only carriages 48c, 48d and 48e, whereas FIG. 3 shows only carriages 48b and 48d.

The carriages being identical, only one need be described. They each include a U-shaped back-up plate 50 or mount for the bird 18, having a pair of bearing blocks 52 rigid thereto and connected with chains 44 by short links 54 (FIGS. 4–6). Each plate 50 has an outwardly and downwardly bowed, vertically adjustable retainer 56, slotted to receive the neck of bird 18, and a pair of laterally adjustable fingers 58, bowed outwardly in opposite directions, and spaced to receive the body of bird 18 above its wings and below its legs.

Each plate 50 also carries a rack 60, reciprocable in bushing 62, and meshing with a pinion 64 in a hood 66, pinion 64 being rigid to a shaft 68 rotatably carried by hood 66. An L-shaped arm 70, rigid to shaft 68, is swingable to and from a position engaging the breast of bird 18 to hold its back against plate 50. A roller 72 on rack 60 travels in a cam slot 74 of an elongated loop 76 secured to framework 28.

A pair of rods 78, reciprocable vertically in blocks 52, carry a head 80 above plate 50, head 80 including a crossbar 82 rigid to rods 78, a pair of upstanding spaced arms 84 rigid to crossbar 82, and a pair of spaced legs 86 rigid to and extending outwardly from crossbar 82. The upper ends of arms 84 are joined by a bar 88 which supports a roller 90. A stop 92 and a shaft 94 also interconnect arms 84, and a finger 96 extends upwardly from one of the arms 84.

A short latch 98 and a long latch 100 reciprocate horizontally in crossbar 82 and between spaced strips 102 joining the ends of legs 86 remote from crossbar 82. Springs 104 around latches 98 and 100 between crossbar 82 and stop pins 106 yieldably maintain pins 106 against strips 102. One end of each latch 98 and 100 is beveled and the opposite end carries a roller 108.

Shaft 94 swingably receives an outer yoke 110, an intermediate yoke 112 and an inner yoke 114, all of which are U-shaped. The bight of yoke 110 has a roller 116 thereon; the bight of yoke 112 has a shank 118 rigid thereto; and the bight of yoke 114 is a tube which receives shaft 94.

An underslung, U-shaped bracket 120, rigid to the legs of the yoke 110, and engageable by the legs of yoke 112 beneath the latter, has its bight engaging latch 100 thereBeneath when yoke 110 is locked thereby in its horizontal position. A spring 122 connects at its lower end with the bight of bracket 120 and connects at its upper end with a tension adjusting bolt 124 depending from an extension 126 on shank 118.

An underslung, U-shaped bracket 128, rigid to the legs of the yoke 114 and engageable by the legs of yokes 110 and 112 therebeneath, has its bight engaging latch 98 therebeneath when yoke 114 is locked thereby in its horizontal position. A spring 130 connects at its lower end with the bight of bracket 128 and connects at its upper end with a tension adjusting bolt 132 depending from extension 126. A spring 134 interconnects the finger 96 and an ear 136 on bracket 128.

The rollers 90 continually support their heads 80 and all parts carried by the latter by virtue of rolling along a track 138 which surrounds the machine 16. Track 138 has an inclined stretch 138a along one side of the machine 16 (FIG. 1) and the arcuate ends of track 138 are essentially horizontal (FIG. 3). At the opposite side of machine 16 (FIG. 2) the track 138 has two inclined stretches 138b and 138c between which is a horizontal stretch 138d. A track 140 on one side only of machine 16 (FIG. 1) engages rollers 90 thereabove.

A short inclined cam rod 142 is provided for rollers 116 on one side of machine 16 (FIG. 2) and on this same side there is provided an inclined stretch 144a of another cam rod 144 for rollers 116. Cam rod 144 continues around one end of machine 16 from stretch 144a into an arcuate, essentially horizontal stretch 144b which terminates at the tube 30 proximal to shaft 36 (FIG. 1).

Framework 28 mounts a release for latch 100 immediately below track stretch 138c (FIG. 2) in the nature of a cam 146 for the roller 108 of latch 100 (FIG. 10) that is adjustably mounted on an inclined plate 148. Track stretch 138c mounts a release for latch 98 adjacent the upper end of stretch 138c (FIG. 2) and taking the form of a cam 150 for the roller 108 of latch 98 (FIG. 11).

An elongated, longitudinally and transversely arcuate spoon 152, mounted on each of the shanks 118 (FIG. 5), has a central notch 154 and a pair of shorter notches 156 at its lower-most free end (FIG. 12). FIGS. 13 and 14 of the drawings illustrates the spoon 152 within the body cavity of the bird 18 between the breastbone 158 and the viscera which include the lungs 160 adjacent backbone 162 and the heart 164 attached to the lungs 160 by veins 166, all forwardly of the heavy bone mass of the hipbones 168.

The overhead conveyor, which includes the chains 22 and shackles 20, advances the birds 18 in continuous succession along the rods 24 and 26, and the machine 16, in timed relation with the overhead conveyor, advances the carriages 48 around the left hand end of machine 16 (viewing FIG. 2) so that each carriage 48 is aligned with a bird 18 at that side of machine 16 shown in FIG. 2 An access opening for the spoon 152 to the body cavity has previously been cut at the vent of each bird 18.

As the rollers 90 reach the inclined stretch 138a of track 138, the heads 80 descend. At the same time, and while the heads 80 are moving downwardly, the rollers 116 engage the cam rod 142, causing the spoons 152 to swing against the action of springs 134 from the position shown in FIG. 5 toward their plates 50. At about the time rollers 90 reach the stretch 138d of track 138, with the heads 80 at the lowermost ends of their vertical movement relative to plates 50, the lowermost ends of spoons 152 will have reached the access openings adjacent the vents of birds 18. Accordingly, the movement of spoons 152 within the bird cavities along backbones 162 will be arcuate about the axes of shafts 94.

While the heads 80 descend and as the spoons 152 swing downwardly, as above explained, the rollers 72 descend to the horizontal portion 74a of slot 74 in loop 76, lowering racks 60 and rotating pinions 64 to swing arms 70 against the birds 18, holding them between fingers 58 with their backs against plates 50.

As the spoons 152 reach the ends of their swinging movement toward plates 50, the bights of brackets 120 and 128 engage the beveled ends of latches 98 and 100, depressing the same slightly against springs 104 until latches 98 and 100 slip beneath brackets 120 and 128. Then, as rollers 116 pass beyond the lower end of cam rod 142, the yokes 110, 112 and 114 are held against upward swinging movement (see FIG. 7, full lines).

The spoon 152 follows the curvature of breastbone 158 without damage to the internal organs, pressing them toward backbone 162, until spoon 152 comes into engagement with the lungs 160. As soon as roller 90 reaches stretch 138c of track 138, the withdrawal of spoon 152 commences, and at this juncture the full tension of both springs 122 and 130 is exerted on spoon 152 so that it bears tightly against lungs 160 (FIG. 14). This dragging, yet yieldable action across the hard to remove lungs 160 (FIG. 7, dotted lines) loosens them sufficiently for easy withdrawal as upward movement of spoon 152 continues.

When spoon 152 reaches the position shown in FIG. 13, roller 108, engaging cam 146 (FIGS. 2 and 10), will release latch 100, permitting yokes 110 and 112 to swing upwardly about shaft 94, thereby releasing the tension of spring 122 on spoon 152 (FIG. 8). But the latch 98 is still engaging bracket 128 and the tension of spring 130 between yokes 112 and 114 is still on the spoon 152.

During continued upward movement of spoon 152 beyond the position shown in FIG. 13, the pressure of spring 130 on spoon 152 will cause the notch 154 of spoon 152 to clear backbone 162 as spoon 152 withdraws the viscera. The veins 166 will be received in notches 156 and through such veins 166 the lungs 160 will be pulled along by the heart 164.

The spoon 152 and the viscera will have been withdrawn from the body cavity by the time roller 108 reaches cam 150 where latch 98 is released, causing yoke 114 to swing upwardly by the action of spring 134 toward the position shown in FIG. 4 and 5.

Before roller 90 continues around the machine 16 beyond stretch 138c of track 138, roller 72 will rise in inclined portion 74b of slot 74 to release arm 70, the latter remaining in its outwardly extended position as roller 72 moves along portion 74c of slot 74 (FIG. 1). The eviscerated bird 18 is therefore freed from the carriage 48 for continued advancement by the overhead conveyor before carriage 48 moves to that side of machine 16 shown in FIG. 1.

As roller 116 engages track stretch 144a, the yokes 110, 112 and 114 are held against full upward movement until roller 116 leaves track stretch 144b, whereupon spring 134 swings yokes 110, 112 and 114 into engagement with stop 92 (FIGS. 1, 4 and 5). Roller 90 descends along track 140 and stretch 138a of track 138 with spoon 152 and arm 70 extending outwardly as shown best by FIGS. 1 and 2 in carriage 48c.

Having thus described the invention, what is claimed as new and desired to be secured by Letters Patent is:

1. In a method of eviscerating a bird, said method including the steps of:
 cutting an access opening to the body cavity of the bird at its vent;
 shifting a spoon linearly in one direction along a first path for inserting the same through the opening and into the cavity between the breastbone and the viscera toward the lung area;
 swinging the bird to a position for receiving the spoon while the spoon is being shifted in said one direction and until said backbone engages a support;
 swinging the spoon toward the backbone along a second path about an axis disposed exteriorly of the bird as the spoon is shifted, whereby it follows the curvature of said breastbone;
 holding the spoon against movement along said first path after it reaches said lung area;
 continuing to swing the spoon toward the backbone along said second path after it reaches said area to gradually press the viscera against said backbone with progressively increased pressure;

holding the spoon against swinging movement away from the backbone to maintain said pressure on the viscera;

shifting the spoon in the opposite direction along said first path while said pressure is maintained to withdraw the spoon from the cavity and to remove the viscera from the cavity by dragging the viscera along the backbone; and holding the bird clamped against said support during swinging of the spoon and during removal of the viscera.

2. In a method of eviscerating a bird, said method including the steps of:

cutting an access opening to the body cavity of the bird at its vent;

shifting a spoon linearly in one direction along a first path for inserting the same through the opening and into the cavity between the breastbone and the viscera toward the lung area;

swinging the spoon toward the backbone along a second path about an axis disposed exteriorly of the bird as the spoon is shifted, whereby it follows the curvature of said breastbone;

holding the spoon against movement along said first path after it reaches said lung area;

continuing to swing the spoon toward the backbone along said second path after it reaches said area to gradually press the viscera against said backbone with progressively increased pressure;

holding the spoon against swinging movement away from the backbone to maintain said pressure on the viscera;

shifting the spoon in the opposite direction along said first path while said pressure is maintained to withdraw the spoon from the cavity and to remove the viscera from the cavity by dragging the viscera along the backbone; and decreasing the pressure during movement of the spoon in said opposite direction and prior to full withdrawal thereof from said cavity.

References Cited

UNITED STATES PATENTS

| | | | |
|---|---|---|---|
| 1,943,077 | 1/1934 | Jansen | 17—11 |
| 2,547,608 | 4/1951 | Toti et al. | 17—11 |
| 2,774,101 | 12/1956 | Ograbisz | 17—11 |
| 2,975,469 | 3/1961 | Viscolosi | 17—11 |

LUCIE H. LAUDENSLAGER, Primary Examiner

U.S. Cl. X.R.

17—11